Oct. 29, 1940.  A. G. F. WALLGREN  2,219,669

BEARING

Filed Dec. 14, 1937

INVENTOR.
August Gustav Ferdinand Wallgren
BY
his ATTORNEY.

Patented Oct. 29, 1940

2,219,669

UNITED STATES PATENT OFFICE 2,219,669

BEARING

August Gunnar Ferdinand Wallgren, Stockholm, Sweden, assignor to A. B. Svenska Kullagerfabriken, Goteborg, Sweden, a corporation of Sweden Application December 14, 1937, Serial No. 179,630
In Sweden December 16, 1936

4 Claims. (Cl. 308—73)

My invention relates to bearings and more particularly to radial bearings of the tilting block type having spherical bearing surfaces.

One of the objects of my invention is to provide a bearing of this kind which permits axial displacement of the shaft with respect to the bearing. Such displacement is desirable in order to allow for expansion and contraction of the shaft due to temperature changes. Heretofore, this has been accomplished in bearings of this type by arranging the entire rotary bearing member which is carried by the shaft and which includes a plurality of bearing blocks, so that it is displaceable as a unit with respect to the shaft, it being mounted slidably thereon. Such an arrangement has a serious disadvantage because that part of the bearing which is under load is pressed with great force against the shaft and hence a large frictional resistance must be overcome in order for axial displacement to take place.

In bearings of the tilting block type an oil film is maintained between the bearing surfaces, which film prevents direct metal-to-metal contact. In accordance with the present invention the bearing blocks forming part of the rotating bearing element are displaceable individually in axial direction with respect to the shaft. Thus, when a change in length of the shaft takes place, an axial directed force is transmitted from the shaft to the bearing blocks. The block or blocks which are under load do not move axially with respect to the shaft, but are displaced a slight distance axially with the shaft, this displacement resulting in a reduction in the thickness of the oil film between the bearing surfaces. When a block thus displaced moves into an unloaded zone of the bearing, the friction between the block and the shaft is materially reduced and the block is able to slide axially along the shaft a distance sufficient to bring it back into alignment with the other bearing member. While the axial displacement of any one block at any one time which results from a compression of the oil film is very slight, the aggregate of the displacement of each block for every revolution is sufficient to take care of the change in length of the shaft.

Figure 1:
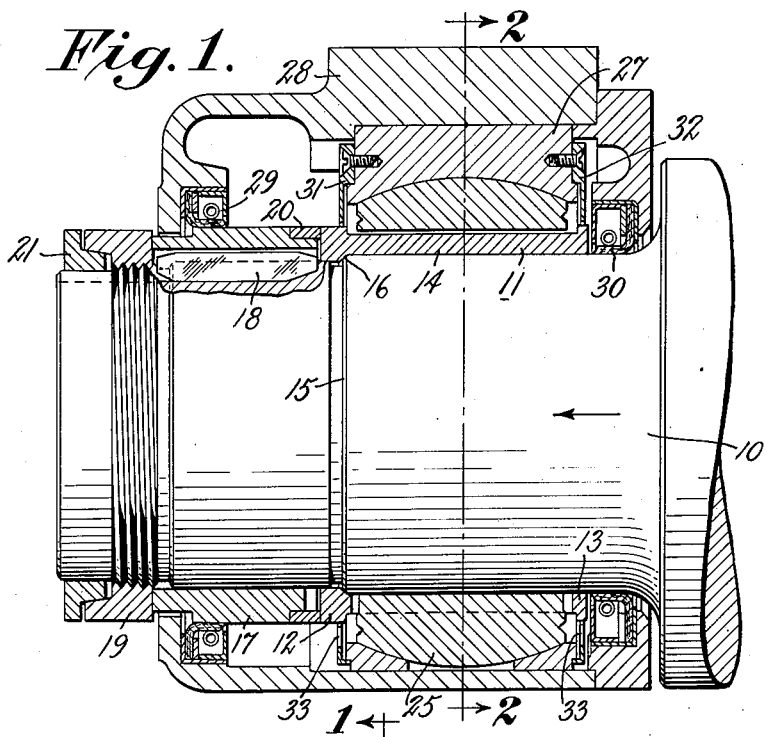
Figure 2:
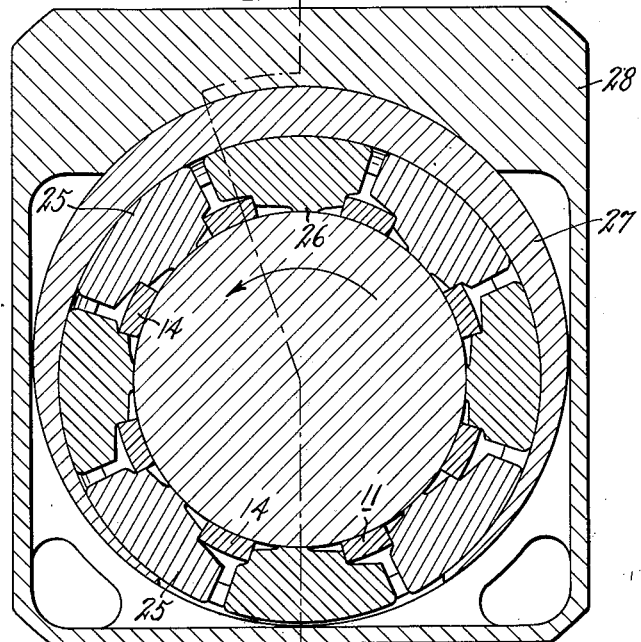

Further objects and advantages will be apparent from the following description considered in connection with the accompanying drawing, which forms a part of this specification, and of which:

Fig. 1 is a cross-sectional view of one embodiment of my invention and is taken on the line 1—1 of Fig. 2; and Fig. 2 is a cross-sectional view taken on the line 2—2 of Fig. 1.

Referring to the drawing, reference character 10 designates a rotatable shaft, which is shown as formed at the end of a roll in a rolling mill. Secured to shaft 10 is a cage 11 comprising annular rings 12 and 13 connected together in spaced relationship by means of axially extending bars 14. Shaft 10 is formed with a shoulder 15 and ring 12 is formed with a cooperating shoulder 16. A sleeve 17 is mounted on shaft 10 and is caused to rotate therewith by means of a key 18. A nut 19 is threaded onto the shaft 10 and bears against the sleeve 17, forcing the sleeve against ring 12 of cage 11 and forcing the shoulder 16 of the ring against shoulder 15 on the shaft. A member 20 may be interposed between sleeve 17 and ring 12, or the sleeve and the cage may be made integrally. In any event, the arrangement is such that the cage 11 is securely fixed to the shaft so that no movement of any kind may take place between the sleeve and the shaft. A locking ring 21 may be employed to lock nut 19 in place and prevent accidental loosening thereof.

A plurality of bearing blocks 25 are arranged around shaft 10 and between the rings 12 and 13 of cage 11. As will be seen from Fig. 1, there is considerable axial play between the axial ends of the blocks and the rings 12 and 13. Blocks 25 are provided with inner supporting projections 26 which bear against the shaft between bars 14. Projections 26 are located nearer to the trailing edges of the blocks than to the leading edges, whereby the blocks are caused to tilt slightly in a well-known manner to provide wedge-shaped spaces between the outer spherical bearing surfaces formed on the block and similar inner spherical bearing surfaces formed on a stationary bearing ring 27. These spaces, during rotation of the bearing, are occupied by wedge-shaped films of lubricant. The bars 14 serve to carry bearing blocks 25 in rotation with the shaft, but do not interfere with the aforementioned tilting of the blocks.

Bearing ring 27 is fixed within a housing 28 which forms a lubricant reservoir. Packing means of any suitable kind, such as is indicated at 29 and 30, are provided at opposite ends of the bearing housing for the purpose of preventing the escape therefrom of lubricant. If desired, annular plates 31 and 32 may be disposed at either end of bearing ring 27 and serve to confine the agitation of lubricant resulting from the rotation of the bearing to the space between the plates. These plates are formed with apertures 33 in their lower parts in order to provide for the circulation of lubricant to the bearing surfaces.

Inasmuch as the bearing illustrated is designed particularly for use in connection with a roll of a rolling mill which sustains an upwardly direct force when in use the bearing will be loaded at its upper part when in operation and bearing ring 27 is made much heavier at the top than at the bottom. Likewise, the bearing housing 28 is constructed in a similar manner, thereby reducing the vertical dimension of the bearing.

The foregoing described device operates as follows: When shaft 10 is subjected to a radial load and is rotated, the blocks 25 tilt slightly about their supports 26 so as to form wedge-shaped spaces between the bearing surfaces on the block and on ring 27 and wedge-shaped films of lubricant are built up in these spaces, thus serving to prevent direct metal-to-metal contact. Should the temperature of the roll be increased, shaft 10 will be displaced axially in the direction indicated by the arrow in Fig. 1. Due to the load on the bearing blocks in the upper part of the bearing, the frictional resistance to sliding between the projections 26 and the shaft is sufficient to prevent such sliding. However, the force exerted in an axial direction by the expansion of the shaft results in a slight compression of the lubricant film between the bearing surfaces disposed to the left of the center line of the bearing, and the blocks in the loaded part of the bearing are displaced with the shaft by this amount. However, as soon as a block passes out of the loaded zone of the bearing, the friction between the projections 26 of that block and the shaft is reduced and the block moves back into alignment with the outer ring 27. This happens as each block passes from the loaded zone into the unloaded zone and hence the individual blocks are successively displaced axially with respect to the shaft, such displacement taking place only when a block is unloaded. This could not occur if it were necessary for all of the blocks to be displaced as a unit, inasmuch as a portion of the blocks are always under load and the loaded blocks would prevent displacement of all of the blocks, including the unloaded ones. However, in accordance with my invention, each block may be displaced individually and hence the displacement may take place at a time when the block is not under radial load. While the distance each block is displaced in this manner is very small, each block is displaced once for every revolution and the total displacement may be any desired amount. Inasmuch as expansion and contraction of a shaft takes place slowly, there is ample time for the displacement to take place.

While I have shown and described one more or less specific embodiment of my invention, this has been done for purposes of illustration only and is not to be considered as limiting the scope of my invention which is to be determined by the appended claims viewed in the light of the prior art.

What I claim is:

1. In a bearing for a shaft to be radially loaded and subjected to axial displacement, an outer stationary bearing ring having an inner spherical bearing surface, a plurality of bearing blocks having outer spherical bearing surfaces coacting with the bearing surface of said ring, said blocks being tiltably mounted with respect to the shaft to provide lubricant-filled spaces between coacting bearing surfaces when the shaft is rotated, a bearing cage fixed to said shaft causing the blocks to rotate with the shaft, said blocks being mounted for individual relative axial displacement with respect to one another and also with respect to the shaft, each of said blocks having an inner bearing surface which frictionally engages the shaft when the blocks rotate to loaded position and causes the blocks to move axially with the shaft and be displaced axially with respect to the bearing ring through a distance limited by the thickness of the lubricant between coacting bearing surfaces, the axial play of the blocks being of such magnitude that the blocks are individually displaceable axially a distance greater than the axial displacement possible between the blocks and the stationary bearing ring.

2. In a bearing for a shaft to be radially loaded and subjected to axial displacement, an outer stationary bearing member, said member having an inner spherical bearing surface, a plurality of bearing blocks each having an outer spherical bearing surface cooperating with the bearing surface of said member, means causing said blocks to rotate with said shaft, said blocks being axially movable with respect to one another and also with respect to the shaft, means tiltably mounting the blocks to form lubricant-filled spaces between coacting bearing surfaces when the shaft is rotated, each of said blocks being provided with a portion which frictionally engages the shaft when the blocks are under load and prevents relative sliding movement between the blocks and shaft, the loaded blocks being displaced axially with respect to the bearing member through a distance limited by the thickness of the lubricant between coacting bearing surfaces, the frictional gripping action between said blocks and shaft being relieved when the blocks rotate to unloaded position and the unloaded blocks shifting axially back to the position they occupied with respect to the bearing member prior to rotation to loaded position.

3. In a bearing for a shaft to be radially loaded and subjected to axial displacement, a housing, an outer stationary bearing ring carried by said housing, said ring having an inner spherical bearing surface, a plurality of bearing blocks mounted for individual axial sliding movement on the shaft and having outer spherical bearing surfaces cooperating with the bearing surface of said ring, a cage causing the blocks to rotate with the shaft, said blocks being tiltable with respect to the shaft to provide lubricant-filled spaces between coacting bearing surfaces when the shaft is rotated, the inner surface of each block contiguous the shaft being formed with a longitudinally extending projection having a shaft bearing surface of such area as to cause the blocks to frictionally engage the shaft when rotated to loaded position to a degree such that they will move axially with the shaft and will be displaced axially with respect to the bearing ring through a distance limited by the thickness of the lubricant between coacting bearing surfaces, the frictional gripping action of said projecting portions being relieved when the blocks are unloaded permitting the unloaded blocks to shift axially back to the position they occupied with respect to the ring prior to rotation to loaded position.

4. In a bearing for a radially loaded axially displaceable shaft, a housing, an outer bearing race fixed to said housing and having an inner spherical bearing surface, a plurality of bearing blocks having outer spherical bearing surfaces coacting with the bearing surface of said race, a cage fixed to the shaft causing the blocks to rotate with the shaft, said blocks being tiltably mounted with respect to the shaft to provide lubricant-filled spaces between coacting bearing surfaces when the shaft is rotated, there being axial play between the blocks and cage of such magnitude that the blocks are individually displaceable axially with respect to both the cage and shaft a distance greater than axial displacement possible between the blocks and the outer bearing race, the inner surface of each block contiguous the shaft being formed with a shaft-bearing portion causing the blocks to frictionally engage the shaft when rotated to loaded position to a degree such that the blocks will move axially with the shaft and will be displaced axially with respect to the bearing race through a distance limited by the thickness of the lubricant between coacting bearing surfaces, the frictional gripping action of said inner bearing portions being relieved when the blocks are unloaded permitting the unloaded blocks to shift axially back to the position they occupied with respect to the race prior to rotation to loaded position.

AUGUST GUNNAR FERDINAND
WALLGREN.